Figure 1:
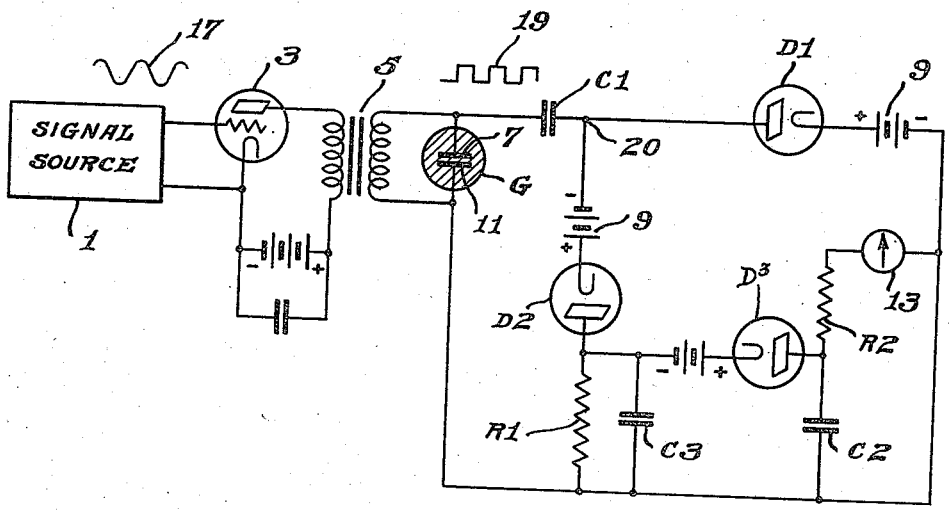

Jan. 5, 1943.                I. WOLFF                2,307,316
                          FREQUENCY METER
                         Filed Feb. 13, 1941

Inventor
Irving Wolff
By
Attorney

Patented Jan. 5, 1943

2,307,316

UNITED STATES PATENT OFFICE 2,307,316

FREQUENCY METER

Irving Wolff, Merchantville, N. J., assignor to Radio Corporation of America, a corporation of Delaware Application February 13, 1941, Serial No. 378,713

10 Claims. (Cl. 172—245)

This invention relates to frequency meters, and particularly to a peak meter for counting or indicating the beat frequency of a signal notwithstanding momentary fading.

Various types of frequency counters have been used to indicate the frequency of a signal. One such counter is disclosed in U. S. Patent No. 2,228,367, which issued on January 14, 1941, on application Serial No. 248,577, filed December 30, 1938, by Royden C. Sanders, Jr., for "Improvement in frequency meters." One of the uses of a frequency counter is in frequency modulated altimeters. A frequency modulated altimeter operates in the following manner: A radio transmitter on the aircraft is used to radiate a frequency modulated wave toward the earth to be reflected therefrom. The frequency of the transmitted wave is varied continuously. A radio receiver located on the aircraft is made responsive directly to the transmitted wave and to the reflected wave. Since the frequency is being varied, it follows that the directly received wave will differ in frequency from the reflected wave. The frequency difference is small for low altitudes and for higher altitudes the frequency difference increases up to the maximum altitude for which the altimeter is designed. The frequency difference results in a beat frequency which may be determined.

While the altitude may be determined by measuring the beat frequency in a number of ways, it is generally most convenient to count the beat frequency by means of a frequency counter, as, for example, the device of the above entitled Sanders patent. In practice, some difficulties are experienced; it has been found that the signal strength of the reflected waves varies periodically at an irregular rate. The rate of variation appears to depend upon the nature of the earth reflecting surface and the altitude. This variation of signal strength may take place in a fraction of a second to several seconds. The signals during these periods may fade out completely or partially. In any event, complete fading is always sufficient to cause a loss of counts and a loss of counts indicates an apparent loss of altitude. Partial fading may cause a similar loss.

It is, therefore, an object of this invention to provide means for indicating beat frequency correctly even though the signal is not present part of the time. Another object is to provide means for indicating the rate of current pulses over a substantial time interval and to prevent the indication from varying during such intervals. Another object is to provide frequency counting means in which a slow decay period maintains a steady indication notwithstanding variation in the strength of the applied signal. An additional object is to provide means in a radio altimeter or radio drift meter for indicating the altitude or drift substantial independent of inherent variations in signal strength.

Figure 2:
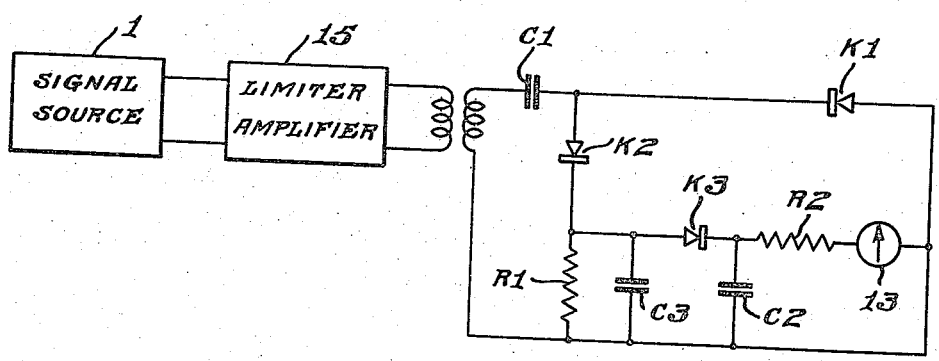

The invention will be described by referring to the accompanying drawing in which Figure 1 is a circuit diagram representing a preferred embodiment of the invention, and Figure 2 is a circuit diagram of a modification. Similar reference characters will be applied to similar elements of the drawing.

Referring to Fig. 1, comprised of the beat frequency produced from the modulation of signals from a frequency modulated transmitter and a reflected wave thereof, a source of signals 1 is preferably connected to a thermionic amplifier or repeater 3. The output of the amplifier is connected through a transformer 5 to a gaseous discharge tube G or to any suitable current limiter. The upper electrode 7 of the gas tube is connected through a capacitor C1 to the anode of a diode rectifier D1. The cathode of the present rectifier, as well as rectifiers hereinafter mentioned, may be biased by a battery 9, which overcomes any "contact potential" and insures substantially perfect unilateral conductivity. The cathode of diode D1, or bias battery if one is used, is connected by the other electrode 11 of the gas tube. The connector of the capacitor C1 and anode of the diode D1 is joined to the cathode of a second diode D2. The anode of the second diode is connected through a resistor R1 which is shunted by a capacitor C3 to the electrode 11 of the gas tube. The anode of the second diode is connected to the cathode of a third diode D3. The anode of the third diode is connected through a capacitor C2 to the electrode 11. The anode of D3 is also connected through a resistor R2 and meter 13 to the electrode 11 of the gas tube.

The circuit of Fig. 2 is similar to that of Fig. 1 with the following exceptions: A limiter amplifier 15 has been substituted for the amplifier 3 and gas tube G. Rectifiers K1, K2 and K3 have been substituted for the diodes D1, D2 and D3, respectively. Rectifiers with substantially perfect unilateral conductivity are preferred, in which case the battery 9 may be omitted. The operation to be described by referring to Fig. 1 also applies to the circuit of Fig. 2.

Alternating currents 17, whose frequency is to be determined, are applied through the transformer 5 to the gas tube G. The gas tube ignites at a predetermined potential, limits the applied currents and produces alternating currents 19 of square wave form. If the upper electrode 7 is negative, the lower electrode 11 will be positive. A positive charge on the anode of D2 will permit current to flow through the diode D2 and the condenser C1 will be charged with the terminal 20 positive. If on the other hand the electrode 7 is positive current flows through the diode D1 and C1 is charged with the terminal 20 negative. If the time constants of the circuits C1, R1, D2 and C1, D1 are short compared to the highest frequency impressed on the system, a practically complete shift from negative to positive charge of C1 takes place in each cycle and the average current through R1 will therefore be proportional to the impressed frequency. The minimum value of C3 is determined so that the time constant of R1, C3 will be longer than the lowest frequency to be measured and the maximum value of capacity so that the build up time of the signal to be applied to the frequency measuring instrument will be that desired.

Furthermore, the charge on capacitor C3 will be negative on the terminal remote from the electrode 11 and positive on the terminal connected to electrode 11. Therefore, the polarity of C3 is such that current will flow unilaterally through the third diode D3. The current through the third diode will charge C2, which is small compared to C3. Since the capacitor C2 is shunted by the resistor R2, which may be made large, and meter 13, it follows that the time constant of the network C2, R2 may be so selected that its charge is proportional to the frequency of the pulses and its discharge or decay time, because of the isolating effect of D3 on discharge, is very slow and independent of the time constant R1, C3. Thus, the capacitor C2 is charged proportional to the beat frequency, and the meter indication will be proportional to the frequency of the applied pulses. If a few pulses are dropped out, due to signal fading or other variation, the slow discharge of the network C2, R2 (isolated as it is by the diode D3) will maintain the meter reading at or very near its initial deflection until the signals are again present, or at least for a very long period.

The time constant of the circuit R1, C3 has been considered. The circuit R1, C3 will include the capacitor C2 at least during increases in altitude. The time constant of the network R1, C3, C2 should be fast enough to follow the increases in altitude without an unreasonable delay or lag. The choice of the time constant of R2, C2 must be related not only to the signal fluctuations but also to the derivative or rate of decrease in altitude. This choice is facilitated by the fact that the fluctuations in signal strength are rapid compared to the fluctuations in altitude. It is thus possible to choose a time constant which will be short enough to follow the altitude indication reasonably well and at the same time preventing the reduction in the meter reading which would otherwise take place due to the dropping out or fading of the signals.

Thus, it will be seen that the invention is a frequency counter in which the final resistor-capacitor network is isolated from the balance of the circuit by a diode, or other unilateral rectifier, so that the network discharge or decay time is made very slow. Thus, downward variations in signal amplitude, which adversely affect a counter continuously averaging the frequency, have no deleterious effect on the counter of the instant invention.

I claim as my invention:

1. A frequency indicating device including a current limiter responsive to the currents whose frequency is to be determined, means for deriving from said limiter currents proportional to the frequency to be determined; a meter responsive to said derived currents and having an initial deflection dependent upon the value of said derived currents, a time constant circuit associated with said meter, and means for isolating unilaterally said meter and said time constant circuit so that said initial deflection will be maintained for a substantial time notwithstanding variations in the amplitude of said derived currents.

2. A frequency indicating device including means for deriving from the currents whose frequency is to be determined a current normally having an amplitude proportional to said frequency and abnormally subject to fluctuations, a first electrical network having a time constant longer than the lowest frequency to be measured, means for applying to said first network said derived currents, a meter, a second electrical network connected to said meter and having a time constant longer than said fluctuations, and means unilaterally connecting said second electrical network and said first electrical network so that the time decay constant of said second network is independent of said first network.

3. A frequency indicating device including a first network having a time constant longer than the lowest frequency to be indicated, a second network having a decay time longer than the period of undesired amplitude fluctuations of the current whose frequency is to be determined, means for applying to said first network currents having normally a value proportional to the frequency to be measured, a meter effectively connected to said second network, and a rectifier connecting said second network to said first network so that the decay time of said second network is independent of the time constant of said first network.

4. A frequency indicating device including a first and a second network having respectively time constants longer than the lowest frequency to be indicated and longer than undesired variations in the amplitude of the currents whose frequency is to be indicated, means for applying to said first network a current of a value normally proportional to the frequency to be indicated, means for limiting the maximum amplitude of said current, a meter effectively connected to said second network, and means unilaterally connecting said first and second networks so that said second network has a discharge time constant independent of the time constant of said first network whereby abnormal fluctuations below said average value have substantially no effect upon the deflection of said meter.

5. The method of indicating the frequency of a current subject to abnormal amplitude variations by means including a pair of electrical networks having dependent charging times and independent discharge times, said discharge times being of longer duration than said abnormal amplitude variations, which includes limiting the amplitude of the currents whose frequency is to be measured to obtain a current whose value is normally proportional to said frequency, applying the thus limited current to charge the first of said pair of networks, unilaterally applying the currents charging said first network to said second network, and indicating the current applied to said second network.

6. The method of indicating the frequency of a current subject to amplitude fluctuations by means including a pair of electrical networks having dependent charging times and independent discharge times, one of said discharge times being of longer duration than said amplitude variations, which includes limiting the amplitude of the currents whose frequency is to be measured, rectifying said limited current to obtain a direct current whose valve is normally proportional to said frequency, applying said direct current to one of said electrical networks to charge same, unilaterally applying currents from said charged network to the other of said networks to charge same, and indicating frequency as a function of the current flowing in said last named network.

7. A frequency indicating device including a current limiter responsive to currents whose frequency is to be determined, means for deriving from said limiter currents proportional to the frequency to be determined, a meter responsive to said derived currents and having an initial deflection dependent upon the value of said derived currents, and means unilaterally isolating said meter so that said initial deflection will be maintained at substantially the peak value of said derived currents for a substantial time.

8. A frequency indicating device including a current limiter, means for applying to said limiter currents whose frequency is to be determined and including currents of amplitudes subject to limitation and currents of less than limitable amplitude, means including a meter for indicating said frequency as a function of the average value of the limited currents, and means for maintaining said indication at substantially its peak value during the application of said currents of less than limitable amplitude.

9. A frequency indicating device including a current limiter, means for applying to said limiter currents whose frequency is to be determined and including currents of amplitudes subject to limitation and currents of less than limitable amplitude, means for rectifying the currents derived from said limiter, means including a meter for indicating the average value of said rectified currents, and means for maintaining said indication at substantially its peak during the application of said currents of less than limitable amplitude.

10. A frequency indication device including a first network having a time constant shorter than the period of undesired amplitude fluctuations of the current whose frequency is to be determined, a second network having a decay time longer than said period, means for applying to said first network currents having normally a value proportional to the frequency to be measured, a meter effectively connected to said second network, and a rectifier connecting said second network to said first network so that the decay time of said second network is independent of the time constant of said first network.

IRVING WOLFF.